United States Patent [19]
Garton et al.

[11] Patent Number: 5,770,094
[45] Date of Patent: Jun. 23, 1998

[54] SCREW CONVEYOR SCREENING APPARATUS FOR REMOVING SOLIDS FROM WASTEWATER

[75] Inventors: M. Shawn Garton, Lucas County; Michael D. Feehan, Monroe County, both of Iowa

[73] Assignee: Johnson Machine Works, Inc., Chariton, Iowa

[21] Appl. No.: 723,062

[22] Filed: Oct. 1, 1996

[51] Int. Cl.⁶ ............................ B01D 29/48; B01D 37/00
[52] U.S. Cl. .......................... 210/791; 210/162; 210/415; 100/117
[58] Field of Search .................................. 210/162, 154, 210/158, 159, 767, 791, 797, 798, 415; 100/117

[56] References Cited

U.S. PATENT DOCUMENTS

| | | | |
|---|---|---|---|
| 2,929,504 | 3/1960 | Lind et al. | 210/162 |
| 3,865,727 | 2/1975 | Broling et al. | 210/162 |
| 4,859,322 | 8/1989 | Huber | 210/162 |
| 5,006,236 | 4/1991 | Croket | 210/162 |
| 5,078,865 | 1/1992 | Huber | 210/162 |
| 5,641,398 | 6/1997 | Huber et al. | 210/162 |

OTHER PUBLICATIONS

Lakeside Equipment Corp.–Rotomat® Screens—Preliminary Waste Water Bulletin #232; Date–Unknown; 4 pg–Brochure—See particularly page entitled Rotamat Micro-Strainer.

Lakeside Equipment Corp.–Quality Equipment Bulletin #109, 12–pg. Brochure—See particularly p. 5; Copyright 1995.

DuraWear Corporation–DuraSlide Xylethon—2 pg Brochure, Date–Unknown.

Hycor Corporation, Shaftless Screw 4–pg. Brochure, Date Unknown.

*Primary Examiner*—Robert Popovics
*Attorney, Agent, or Firm*—Zarley, McKee, Thomte, Voorhees, & Sease

[57] ABSTRACT

An apparatus and method for removing solids from waste water includes a screen trough and screw auger combination. The screw auger's internal edge is connected to and supported by an axle. According to another feature of the invention, a replaceable edge of material can be used at the very edge of the spiral flighting of the screw auger. A still further optional feature can be the use of a spray bar to direct spray onto the faces of the spiral flighting of the screw auger.

23 Claims, 2 Drawing Sheets

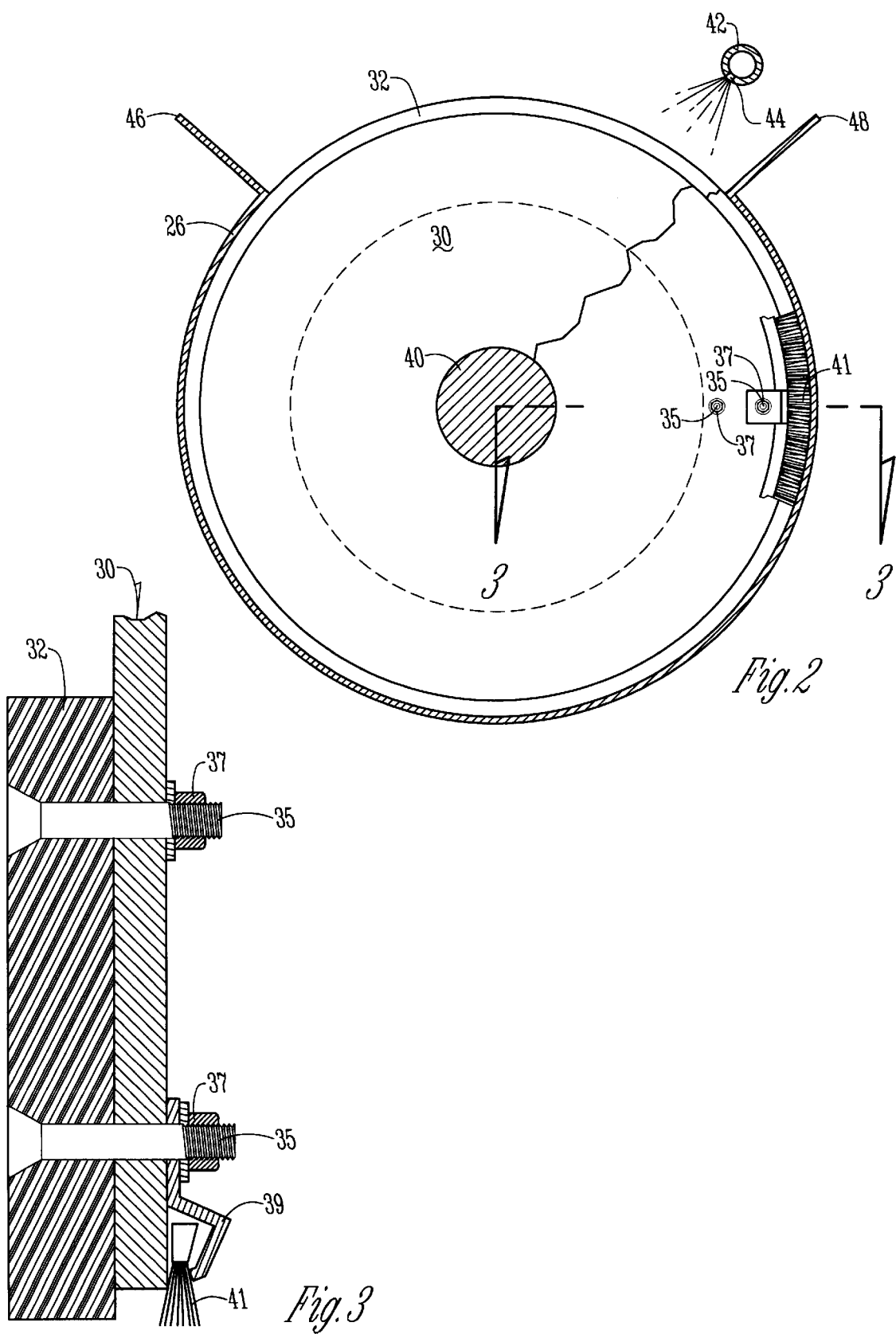

SCREW CONVEYOR SCREENING APPARATUS FOR REMOVING SOLIDS FROM WASTEWATER

BACKGROUND OF THE INVENTION

1. Field of the Invention

This invention relates to removing solids from waste water, and in particular, to apparatus and methods using a screen or strainer to remove solids from waste water and a screw of spiral flighting to transport these strained solids to a removable location.

2. Problems in the Art

Effective, efficient and economical processing of waste water is becoming increasingly important. A number of technologies exist to do so, but some are more economical than others, and some can be used only in certain situations.

A particular phase of waste water treatment is the removal of solids of relatively large size, for example, on the order of ⅛ of an inch in diameter or larger. Removal of this size of solids allows for further processing with additional equipment without the risk of clogging or accumulation of debris.

To accomplish this both effectively and efficiently is not a trivial matter. Not only must the removal of the solids be accurate and consistent, it must be done on a continuous basis without requiring shutdown of the system for cleaning. It also must allow a reasonable amount of throughput and most times it is desirable the equipment be economical.

Most systems of this type have a water conduit into which is interposed some sort of apparatus that will prevent solids larger than a certain size from passing to an outlet. The apparatus usually utilizes a mechanism to collect and transport the blocked solids to a different location where it can be processed.

Equipment of this type is available from at least several sources. One example is Lakeside Equipment Corporation of Bartlett, Ill. Another example is Hycor Company of 29850 N. Highway 41, Lake Bluff, Ill., 60044.

A particular type of such apparatus utilizes a screen having openings to screen or strain, from the water passing through the conduit, solids on the order of and larger than the size of the openings. One term commonly used to describe these type of devices is a micro-strainer. The component that strains the solids is typically called a screen trough. A conventional way of removal of the strained solids is with a screw auger which closely conforms to the shape of the screen trough and essentially scrapes the solids that are strained from the screen trough and conveys them to additional apparatus that transport them for further processing. They can be delivered, for example, to a wagon or trailer and be transported to a disposal site. Alternatively they could be dried and then transported for disposal. In some situations they can be recycled or re-used in different ways.

An interesting characteristic of conventional microstrainers of the type just described is the conscious decision to use spiral flighting as the screw auger without any type of drive shaft or axle to support the flighting, at least at the area of the screen trough. The spiral flighting must be made in a shape to scrape materials off of the screen trough. Therefore they are generally made of strong material such as steel. The closer the match between the steel outer edges of the spiral flighting and the inner surface of the screen trough, the better the removal of the solids. However, conventional micro-strainers are also concerned with clogging or debris attaching to the screw auger. The elimination of any supporting shaft or central drive train to the spiral flighting has been thought to have solved one area of risk regarding clogging or collection of debris.

On the other hand there cannot be too tight of fit between the spiral flighting and the screen trough or the screen will plug. Excessive wear or binding of the screw auger can also take place. One particular problem that has been discovered with regard to conventional micro-strainers is that the manufacturing tolerances for them cannot be precise enough to allow the desired tolerance (at or around the level of 0.040 of an inch). The decision not to use a center support in the spiral flighting also eliminates structure that could assist in holding the auger shape for better solids removal.

Still further, it has been discovered that traditional use of hard materials such as steel for the spiral flighting edges does not result in maximum cleaning of the screen trough of solids. Additionally it has been discovered that a problem exists with particles hanging or adhering to the faces of the spiral flighting.

It is therefore a principle object of the present invention to provide an apparatus and method for separating solids from waste water which improves over the problems and deficiencies in the art.

Other objects, features, and advantages of the present invention include provision of a means and apparatus as above-described which:

Reduce debris adhering to the screw auger and the screen trough.

Improves the ability to control spiral flighting edge tolerances.

Improves the stability of and therefore allows better tolerances for the apparatus.

Allows for bigger, wider devices and more throughput in one device.

Results in better cleaning and removal of solids.

Is more economical because of the ability to manufacture without making an unsupported spiral flighting.

These and other objects, features, and advantages of the present invention will become more apparent with reference to the accompanying specification and claims.

SUMMARY OF THE INVENTION

The invention includes an apparatus which has a screen trough, a screw auger with spiral flighting, and a housing in which the screen is interposed in a water pathway. A structural support is positioned along the longitudinal axis of the spiral flighting, and the spiral flighting is attached to the structural support. Although the support is in the water pathway, it provides structural rigidly that enhances the ability to create close tolerances between the spiral flighting outer edge and the screw trough.

According to another aspect of the invention, a replaceable edge can be mounted on the outer edge of the spiral flighting. The replaceable edge is made out of a material that can be made to close and exacting tolerances, yet is better able to handle the scrapping and stresses experienced by this type of machine.

According to another optional feature of the present invention, a spray bar can be positioned above the spiral flighting with spray nozzles oriented to assist in directing particles that otherwise may adhere to the faces of the spiral flighting in a direction towards the edge of the spiral flighting to enhance the removal of such materials and aids in cleaning the screen.

The method according to the invention includes supporting the center of the spiral flighting. Other features can include positioning a replaceable edge on the spiral flighting and encouraging movement of particles to the outer edge of the spiral flighting.

BRIEF DESCRIPTION OF THE DRAWINGS

FIG. 2 is an enlarged sectional view taken along line 2—2 of FIG. 1.

FIG. 3 is an enlarged sectional view taken along line 3—3 of FIG. 2.

DETAILED DESCRIPTION OF THE PREFERRED EMBODIMENT

A. Overview

Figure 1:
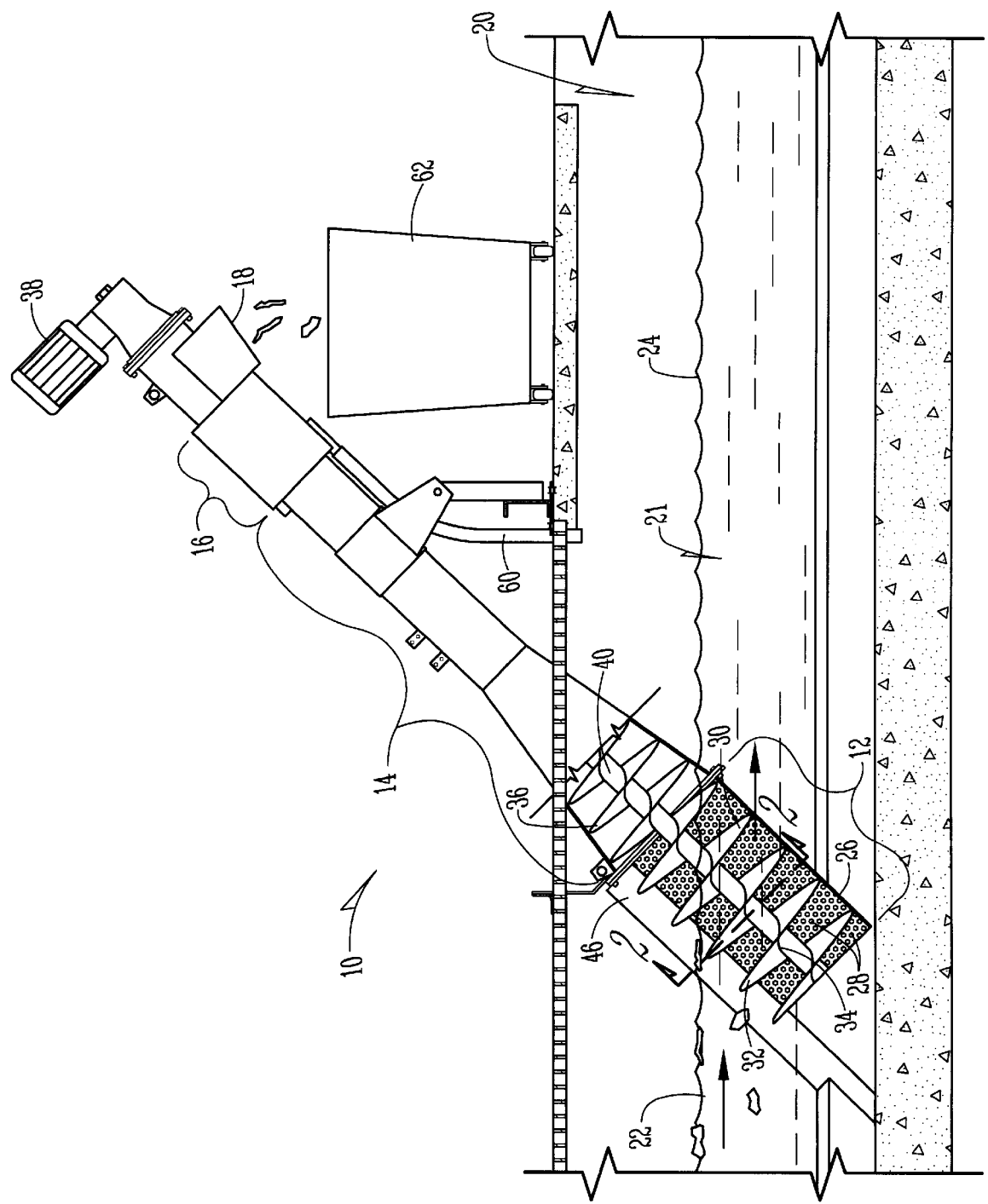
FIG. 1 is a partial sectional side elevational view of a micro-strainer machine according to the present invention.

To better understand the invention, one embodiment will now be described in detail. Frequent reference will be taken to the drawings which are described immediately above. Reference numerals will be used to indicate certain parts and locations in the drawings. The same reference numerals will be used to indicate the same parts and locations throughout the drawings unless otherwise stated.

As has been previously described, micro-strainers are well know in the art. An example of a micro-strainer according to the general apparatus of the present inventions is the ROTOMAT® MICRO-STRAINER make by Lakeside Equipment Corporation, P. O. Box 8448, Bartlett, Ill. 60103. In describing this embodiment, the general structure of the micro-strainer will first be set forth. Specifics of the present invention will then be pointed out, followed by a discussion of a method of operation according to the invention. Finally, alternatives and options will be discussed.

By referring to FIG. 1, reference numeral 10 will be used to generally designate a micro-strainer apparatus or system. Micro-strainer 10 includes a strainer section 12 followed by a conveyer section 14, a de-watering chamber 16, and an outlet 18. Straining portion 12 is placed within a water channel 20. Water 21 in channel 20 has an untreated side 22 and a treated side 24. Water 21 is contained within channel 20, which is made of concrete or other material and strainer portion 12 fills up the entire space across channel 20 so that water cannot move around strainer portion 12, as is known in the art.

As can be seen in FIG. 1, a screen trough 26 having a plurality of small openings 28 comprises the "strainer" of strainer section 12. Spiral flighting 30 of a screw auger having an outer continuous edge 32 and an inner continuous edge 34 nests or mates within screen trough 26. Spiral flighting 36 continues from spiral flighting 30 in conveyer section 14. De-watering section 16, and outlet 18 are positioned at the top of device 10. A motor 38 drives a shaft 40 to rotate spiral flighting 30 and 36.

As is well known in the art, screen trough 26 can take on different forms and configurations. In FIG. 1 openings 28 are small (⅛ inch in diameter), relatively circular holes, evenly spaced apart (⅛ inch apart) in staggered fashion. Openings 28 could be of a variety of sizes. In most situations they will be on the order of 0.010" to 0.250" in largest diameter, but other sizes are possible. As is further known in the art, the outer edge 32 of spiral flighting 30 is configured to very closely move around the inner surface of screen trough 26 so that it can essentially scrape collected solids on that side of screen trough 26 and advance them up to conveyer section 14.

FIGS. 2 and 3 illustrate further aspects of micro-strainer 10. Outer edge 32 comprises a removable piece that is bolted to spiral flighting 30 by bolts 35 secured with nuts 37. Edge 32, therefore, comes into close contact or even abutment with screen trough 26 instead of the actual spiral flighting of 30. Any wear and tear on edge 32 can then be resolved by replacement at a much cheaper cost than the entire spiral flighting 30.

FIGS. 2 and 3 also show that a brush 41 can be mounted to the opposite face of spiral flighting 30 from edge 32 by bracket 39 (see particularly FIG. 3). Brush 41 would assist in cleaning screen trough 26. In FIG. 2 only a portion is shown, however, brush 41 is continuous along flighting 30.

FIG. 2 shows a still further feature of micro-strainer 10. A spray bar 42 having a plurality of nozzles 44 can be placed in parallel relationship to spiral flighting 30. Spray (e.g. water) from spray bar 40 would be directed to the faces of spiral flighting 30 in a manner which would encourage particles to move or migrate to the outer edge 32 of spiral flighting 30. This deters accumulation or adherence of such particles to the faces of spiral flighting 30. Spray from spray bar 40 also aids in cleaning the screen.

In the preferred embodiment, edge 32 is made of Xylethon®. Such material is available from DuraWear Corporation, 2598 Elton Road, Birmingham, Ala. 35210. Xylethon® is a plastimeric that can be formed to fairly exact tolerances and shapes. In the preferred embodiment edge 32 would extend about ⅛ to ¼ inch outside the perimeter of spiral flighting 30 and would be approximately ½ inch in thickness and 3 to 4 inches from inner edge to outer edge. Xylethon® is more wear-resistant than many other plastics. It would be bolted onto the edge of spiral flighting 30 commensurate with the location of screen trough 26.

Spray bar 42 can simply be a conventional water conduit with spaced apart openings along its longitudinal axis that serve as nozzles, or separate nozzles can be incorporated therein such as is well within the skill of those skilled in the art. It is preferred that the nozzles be positioned generally in correlation with the spacing between spiral flightings and placed off to the side (see FIG. 2) to direct spray in a manner that encourages particles to move to the edge of spiral flighting 30 and to clean screen trough 26.

As can been seen in FIG. 1 the longitudinal axis commensurate with shaft 40 is tilted at approximately 45° toward the water pathway. In the preferred embodiment, the diameter of screen trough 26 is approximately 24 inches. Different sizes, and particularly larger sizes, are possible.

Screen trough 26 is made of solid 11 gauge, perforated plate stainless steel, with a 90° opening between extensions 46 and 48 (see FIG. 2), which are called deflection or seal plates to force materials down into the screen trough area. The radius between the center of screen trough 26 and its perimeter is approximately 1 foot, 1 inch, and screen trough 26 is 3 feet, ¾ inches long.

Bolt 35 can be a ¼ by 1 ¼ inch flathead screws and nut 37 can be a flat washer with a lock nut. Brush 41 with brush clip 39 can be placed every 4 inches of every 3 feet of exposed spiral flights. Bracket 39 can be aluminum and brush 41 can be a synthetic bristle brush such as is known in the art.

As can be seen in FIG. 1, the flights 30 along section 12 are all the same in size and diameter. Decreasing diameter flights are used in section 14 to constrict down the diameter of the conduit for transport of the solids up device 10 to outlet 18 of the flights. The pitch along the auger can vary according to choice, but in the preferred embodiment, it is 4 pitches at 8 inches for the spiral flighting 30 in screen trough 26.

The largest diameter of those flights is approximately 23 ½ inches outside diameter, plus or minus 1/32 inch for spiral flighting 30. Edge 32 has an installed outside diameter of 23.7658 inches, plus 0.0005 minus 0.0000 inches. The interior diameter of screen trough 36 is 24.000 inches, plus 0.005 minus 0.000 inches. It is to be understood that edge 32 exists only along flighting 30 in screen trough 36, and is not necessary on flighting 36.

As previously mentioned, it is desirable that the outer edge 32 of the spiral flighting 30 closely correspond to the interior surface of screen trough 26. With the utilization of edge 32 bolted onto spiral flighting 30, according to the present invention, the limitation on manufacturing tolerances on screen trough 26 can be better handled. In other words, because tolerances down to 0.040 cannot be reached with screen trough 26, edge 32 can wear down without ruining the whole spiral flighting 30. Edge 32 can also operate better than steel edges.

Shaft 40 is generally called a torque tube. In the preferred embodiment it is a little over 13 feet long and a 3 inch diameter standard pipe. The inside edge of spiral flighting 30 can be welded or otherwise attached to pipe 40. Use of shaft 40 increases the stability and improves the operation of micro-strainer 10 compared to conventional micro-strainers which intentionally omit any center shaft or support and just rotate the spiral flighting itself.

Micro-strainer 10 operates as follows. Untreated water 22 flows into the open top between deflection plates 46 and 48 of micro-strainer 10, and through the apertures 28 in screen trough 26 to the treated water side 24. The water must pass through screen trough 26 to get to side 24. Motor 38, at the same time, rotates shaft 40 that extends throughout micro-strainer 10. Bearings and journals are utilized with shaft 40, as is well known in the art. Solids that will not pass through the apertures 28 in screen trough 26 either collect on the interior surface of screen trough 26 or are moved upwardly by direction of rotation of spiral flighting 30. Because of the closeness of edge 32 to screen trough 26, spiral flighting 30 essentially scrapes off any debris from screen trough 26 and it moves upwardly. Spiral flighting 36 carries solids and some water through section 14. De-waterer 16 gets rid of any water from solids by a compacting process and such water is returned back through tube 60 to treated water side 24 of the water stream. Outlet 18 then directs solids that are ejected from micro-strainer 10 into, for example, a bin 62 which can then transport the solids for further processing.

By utilizing shaft 40 all the way through spiral flighting 30, a rigid rotational axis and drive shaft is established that allows more stability for spiral flighting 30 at the location of screen trough 26. Shaft 40 can also be used to rotate flighting 36.

Utilization of edge 32 provides for better cleaning and better operation of micro-strainer 10, and further is a much more economical solution to ultimate wear and tear on the screw auger than using all steel flights. It eliminates metal-to-metal contact between flighting and screen trough. The spray bar 42 sprays spiral flighting 30 to promote movement of particles to the edges where they can be transported away and sprays screen trough 36 to clean it.

The included preferred embodiment is given by way of example only, and not by way of limitation which is solely described by the claims herein. Variations obvious to one skilled in the art will be included within the invention defined within the claims.

For example, materials other than Xylethon® can be used for edge 32. Other mounting methods and sizes of edge 32 can be used.

The size and material of shaft 40 can vary according to need. The features of the invention can also be utilized with other types of screen troughs. For example, screen troughs having channels parallel to the longitudinal axis of the screw auger are commonly used.

The size of micro-strainer 10 can also vary. One feature of micro-strainer 10 is the ability to control tolerances or deal with the needed precision. This is satisfactorily taken care of so that diameters of almost double the 24 inch diameter can be used. This would increase the throughput and therefore efficiency and economy of the treatment system. Such sizes are not possible with conventional micro-strainers because of the tolerance problems with the screen trough and all steel spiral flighting without a center axle support.

What is claimed:

1. An apparatus for screening solids in waste water treatment comprising:

a screen trough;

a plurality of spiral flights extending along a longitudinal axis, the spiral flights having an interior edge and any outer edge;

the spiral flights attached at the interior edge to an axle drive shaft positioned along the longitudinal axis and extending to the outer edge;

the outer edge of the spiral flights nesting within the screen trough which receives and matingly matches a portion of the spiral flights so that when rotated, solids which collect on the screen trough are moved in the direction of the longitudinal axis of the flights, off the screen trough, and to a collection section; and a replaceable edge mounted on the outer edge of the spiral flights, the replaceable edge comprising a band having a body which is removable mounted to the outer edge of the spiral flight and a distal surface extending beyond the outer edge, but still allowing the spiral flights to rotate within the screen trough.

2. The apparatus of claim 1 wherein the screen trough further comprises a micro strainer.

3. The apparatus of claim 1 wherein the screen trough further comprises a piece having a plurality of apertures therein, the piece being curved to match the perimeter of the spiral flights.

4. The apparatus of claim 3 wherein the apertures comprise openings of generally the same size and space equally spaced apart along the piece.

5. The apparatus of claim 3 wherein the apertures are on the order of approximately 0.010" to 0.250" in largest diameter.

6. The apparatus of claim 1 wherein the plurality of spiral flights when rotated about the longitudinal axis define a cylinder.

7. The apparatus of claim 1 wherein the screen trough has an inner surface that closely approximates the cylinder.

8. The apparatus of claim 7 wherein the spiral flights scrape against the screen trough.

9. The apparatus of claim 1 further comprising a brush in generally parallel relationship to the replaceable edge to assist in removal of solids from the screen trough.

10. The apparatus of claim 1 wherein the axle drive shaft extends generally parallel to the screen trough.

11. The apparatus of claim 10 wherein the drive shaft extends beyond an end of the screen trough, and includes additional conveying spiral flighting to transport solids to the collection section.

12. The apparatus of claim 11 wherein the conveying spiral flighting is at least substantially enclosed.

13. The apparatus of claim 1 further comprising a waste water inlet and a water pathway between the inlet and the screen trough, which comprises a water outlet, so that waste water carrying solids enters the inlet and passes around the spiral flights and through the screen trough, which strains solids larger than the openings in the screen trough and allows the spiral flights to transport strained solids away.

14. The apparatus of claim 1 wherein the collection section comprises a housing surrounding an upper portion of the drive shaft and additional spiral flights attached to that upper portion.

15. An apparatus of the type to screen solids from waste water, including a walled channel defining a water pathway, an inlet to the channel through which unscreened waste water passes into the channel, a straining screen placed across the water pathway in the channel, a rotatable spiral flighting positioned along a longitudinal axis adjacent the screen and having free, unattached inner and outer edges, the straining screen having a shape which closely conforms to the outer edge of the spiral flighting, the improvement comprising:

a rotatable support member positioned along the longitudinal axis of the spiral flighting to which is attached at least portions of the inner edge of the spiral flighting; and the outer edge comprises a replaceable piece, the replaceable piece comprising a band having a body which is removable mounted to the outer edge of the spiral flight and a distal surface extending beyond the outer edge, but still allowing the spiral flights to rotate within the screen trough.

16. The apparatus of claim 15 wherein the rotatable support member also functions as a drive shaft for the spiral flighting.

17. The apparatus of claim 15 wherein the spiral flighting is attached to the rotatable support member at discrete points along the inner edge.

18. The apparatus of claim 15 wherein the spiral flighting is attached to the rotatable support member continuously along the inner edge.

19. The apparatus of claim 15 the replaceable piece is made of a material that wears faster than the flighting.

20. The apparatus of claim 19 wherein the material is plastimeric and the flighting is metal.

21. The apparatus of claim 15 further comprising a sprayer positioned above the spiral flighting.

22. The apparatus of claim 21 wherein the sprayer is offset from the top of the flighting.

23. A method of improving the operation of an apparatus of the type to screen solids from waste water, including a housing defining a water pathway, an inlet to the housing through which unscreening waste water passes into the housing, a straining screen placed across the water pathway in the housing, a rotatable spiral flighting positioned adjacent the screen and having free, unattached inner and outer edges, the straining screen having a shape which closely conforms to the outer edge of the spiral flighting, the method comprising;

supporting the spiral flighting along its rotational axis;

utilizing a replaceable outer edge on the spiral flighting; and spraying fluid on one or more of the spiral flighting and straining screen during operation.

* * * * *